Feb. 27, 1968   G. E. HAFER ETAL   3,370,384
AUTOMOTIVE VEHICLE DOOR AND METHOD OF MAKING SAME
Filed June 17, 1964
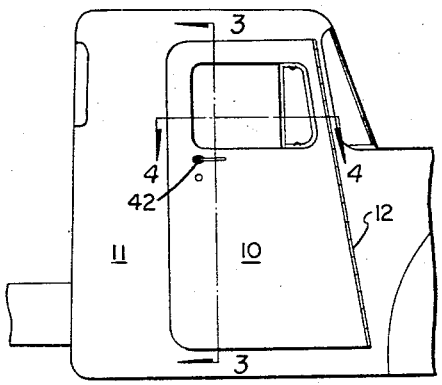
FIG. 1
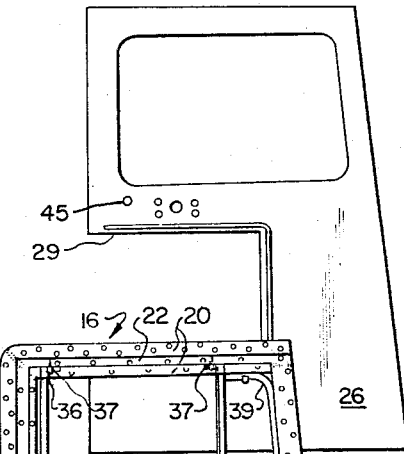
FIG. 2
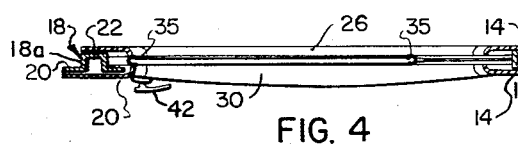
FIG. 4
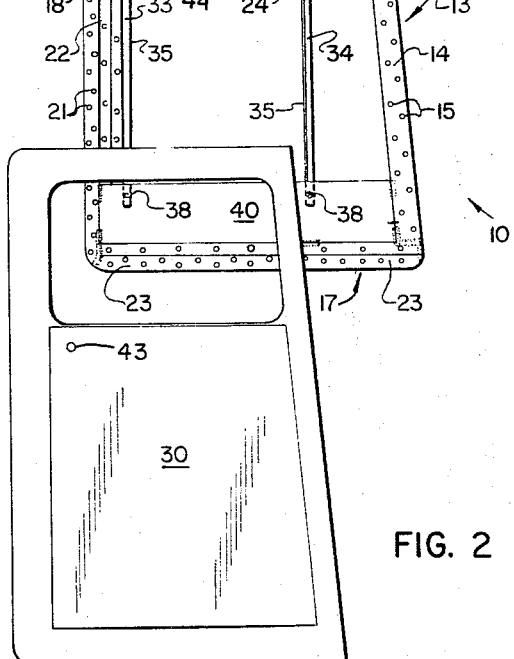
FIG. 3
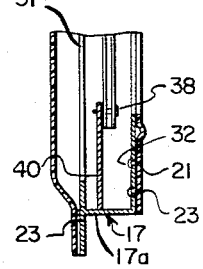
INVENTOR.
GEORGE E. HAFER
CHARLES S. WILLIS
BY
ATTORNEYS

United States Patent Office 3,370,384
Patented Feb. 27, 1968

3,370,384
AUTOMOTIVE VEHICLE DOOR AND METHOD OF MAKING SAME
George E. Hafer and Charles S. Willis, Salt Lake City, Utah, assignors, by mesne assignments, to Ibex Motor Truck Corp., Salt Lake City, Utah, a corporation of Utah
Filed June 17, 1964, Ser. No. 375,818
10 Claims. (Cl. 49—502)

This invention relates to automotive vehicle doors and is particularly concerned with providing an unusually rugged, but very lightweight door for use on large, heavy duty trucks, particularly those designed for off-highway use.

Because of the "racking" i.e. lateral twisting of the cabs and frames of large trucks used in construction, logging, power wire stringing, and other operations where the work requirements are heavy and the terrain encountered is very rough, conventional truck doors have not been found satisfactory. Since conventional doors are of multiple piece construction, with the pieces held together by bolts or sheet metal screws, they often fall apart under the twisting and vibration, thus necessitating frequent work stoppages for maintenance and repairs.

With most large trucks, regardless of the terrain on which they are designed to operate, the weight of a cab door is so great that it frequently tears loose from its hinges or breaks the supporting post to which the hinges are attached. Rather than stopping operations to make the necessary repairs, drivers often simply take the doors off the truck cab and leave them off, thus creating an obvious safety hazard. In addition, replacement of glass in the usual truck cab door is a time consuming task, usually requiring the glass to be removed and replaced through the lower portion of the door. During this operation the replacement glass is frequently broken.

In the making of the present invention, it was a principal object to provide an extremely rugged vehicle door well adapted to withstand the forces encountered during off-highway, heavy-duty use of the vehicle, and yet light in weight so as not to impose excessive strain on the supporting hinge or hinges. This was accomplished by a unique method of construction.

Further objects were to provide a door having a straight hinge post extending the full length, i.e. height, of the door, such that a piano hinge can be employed to provide effective support throughout the full height of the door, and a door wherein the glass window can be easily removed and quickly replaced through the usual window opening in the door.

We have found that laminating inner and outer fiber-glass panels to opposite faces of a lightweight structural framework provides a unitary door of unusual strength, well adapted to withstand the stresses imposed by racking of the cab and frame and so light as to not place undue strain on its hinge connection with the vehicle body. A typical door built according to this method, complete with all necessary hardware and glass, weighs approximately fifty-one pounds, as compared to the usual truck door weight of approximately one hundred and twenty pounds.

There is shown in the accompanying drawing a construction presently regarded as the best mode of carrying out the generic concepts of this invention in actual practice. From the following detailed description, other more specific objects and features of the invention will become apparent.

In the drawings:

FIG. 1 is a fragmentary side elevation of a truck cab and a door therefor constructed in accordance with the invention;

FIG. 2, an exploded perspective view of the door drawn to a considerably larger scale;

FIG. 3, a vertical section through the door as taken on the line 3—3 of FIG. 1 and drawn to a scale larger than that of FIG. 2, with an intermediate portion broken out for convenience of illustration; and FIG. 4, a horizontal section taken on the line 4—4 of FIG. 1.

Referring now to the drawings:

The door 10 of the invention is normally suspended in customary manner from cab 11 of a truck by a piano hinge 12 extending the full height of the door.

Hinge 12 is connected to the truck cab in the usual manner, for example by screws (not shown), and to a straight, i.e. rectilinear, hinge post 13 of the door 10, again by screws (not shown). Post 13 is part of an intermediate or interior framework, preferably fabricated from aluminum extrusions. Thus, as illustrated, post 13 is hollow and box-like and of rectangular cross section having sides 14 with holes 15 formed therethrough in mutually spaced relationship. Upper and lower frame members 16 and 17 are secured, as by welding, to post 13 and to a corresponding vertical post 18.

Upper frame member 16 and vertical post 18 are each advantageously U-shaped, with flanges 20 extending outwardly from the legs of the U, spaced holes 21 being provided in the flanges and also in the webs 22 of the respective U-shaped members. The flanges 20 of the respective frame members and one of the sides 14 of the post 13 form part of one broad face (outside) of the framework, while the webs 22 and other side 14 form part of the other broad face (inside) of such framework.

Lower frame member 17 is an aluminum extrusion having a Z cross section. Both of the legs 23 of the Z have holes 21 therethrough. One leg 23 constitutes part of the one broad face (outside) of the framework, while the other leg 23 forms part of the other broad face (inside).

The posts 13 and 18 are also interconnected by a U-shaped frame member 24, which has an elongate opening 25, FIG. 3, in the web of the U, through which a window (not shown) can be moved during its vertical travel within the door.

Both the frame member 24 and an inside panel 26 have holes 27, FIG. 2, in them to allow for insertion and support of a window operating handle (not shown). Additional holes 28 in member 24 are provided to support the usual window and its bracket mountings (not shown).

Inside panel 26 is flat and configurated to conform to the inside face of the framework, except that a portion 29, FIG. 2, thereof is advantageously left open to afford access to the window-operating mechanism inside the door. A screw-on cover (not shown) may be provided to close the opening 29 if desired.

Both the inside panel 26 and an outside panel 30, which is configurated to conform to the outside face of the framework, are advantageously fabricated from fiberglass impregnated with a suitable resin according to well-known techniques. They are bonded to respectively opposite broad faces of the interior framework by a suitable laminating resin, for example, Polyester Resin No. 7065 manufactured by Utah Resin Company, Salt Lake City, Utah, leaving the peripheral edge faces 16a and 17a, FIG. 3, and 13a and 18a, FIG. 4, of the interior framework exposed as peripheral edge faces of the door.

The bonding process consists of placing mats 31, FIG. 3, of pressed fiberglass between the framework and the respective panels 26 and 30, saturating them with the resin, and then holding the panels in place against the mats and framework under pressure, thereby forcing the resin to expand through the anchoring holes 21 of the framework. The resin not only bonds to the side walls of the holes, but exudes through and beyond the holes to form globular masses 32 larger than the holes, which, after drying, act like rivet heads to anchor the panels securely in place. Thus, the resin contained in the mat 31 that is positioned between the framework and inside panel 26 is forced through the holes 21 in the web portions of the upper frame member 16 and post 18, in the one side of the box-shaped post 13, and in the upwardly extending leg of Z-shaped lower frame member 17. Similarly, resin contained in the mat 31 that is positioned between the framework and exterior panel 30 is forced through the holes 21 in the flanges 20 of upper frame member 16 and post 18, in the opposite side of the box-shaped post 13, and in the downwardly extending leg of Z-shaped lower frame member 17. The door so formed is then of laminated construction but with a hollow core formed interiorly of the framework and between the fiberglass panels.

The panels 26 and 30 and vertical support post 18 of the framework are drilled as required to provide the necessary holes (not shown) for mounting a conventional door latch and operating handles (not shown).

Conventional side channels 33 and 34, FIG. 2, are mounted inside the interior framework to serve as vertical guides for the window glass, which is not shown. These are U-shaped members, having chrome beads 35 extending the length of each leg of the U and yieldable weatherstrip material lining the slideway channels provided by the U formation. These side channels are fixed to upper member 16 by flange 36 and screws 37 and extend through elongate opening 25, their lower ends being connected by means of screws 38 to a stiffener 40, which interconnects posts 13 and 18.

Side channel 34 preferably carries a usual pivoted wind wing frame 39, which is further anchored to post 13 by a screw 41.

To replace a broken window glass, it is only necessary to first remove screws 37 and 38 of channel 34 and screw 41 of the wind wing and to lift channel 34 out of the door. Sufficient clearance is provided between channel 34 and the sides of elongate opening 25 to allow easy removal. It is then a simple matter to slide the glass out of its channel 33 and to lift it out through elongate opening 25 and the window opening of the door.

A reverse procedure is followed in installing replacement glass. Obviously, any driver can easily make necessary glass replacements, without fear of breaking the new glass during installation.

A door handle and associated latch mechanism of any suitable type, indicated generally by 42 in FIGS. 1 and 4 are installed in any suitable manner; for example through receiving openings 43, 44, and 45 in outside panel 30, member 24 of the intermediate framework, and inside panel 26, respectively, see FIG. 2.

Whereas there are here disclosed a certain preferred construction and a method, which are presently regarded as the best mode of carrying out the invention, it should be understood that various changes may be made and other constructions and procedures adopted without departing from the inventive subject matter particularly pointed out and claimed hereinbelow.

We claim:

1. A vehicle door, comprising an interior framework of lightweight, hollow-core-forming, frame members having mutually opposite, broad faces corresponding to the outside and inside faces of the door, respectively; inside and outside fiberglass panels; adhesive means bonding said panels to the respectively corresponding faces of said framework whereby a hollow core is formed interiorly of the door, between the fiberglass panels, the peripheral edge faces of said framework forming the peripheral edge faces of the door; means in said door for receiving a vehicle window and window-operating mechanism, and means including a door handle for opening and closing said door.

2. A vehicle door according to claim 1, wherein the adhesive means is a polyester resin, and wherein the inside and outside faces of the interior framework have holes therethrough into which the polyester resin penetrates and is anchored.

3. A vehicle door according to claim 1, wherein the adhesive means is a resin and there are mats of fiberglass impregnated with the resin interposed between the respective panels and the interior framework.

4. A vehicle door according to claim 1, wherein the interior framework includes a rectilinear hinge post extending the full height of the door and providing one exterior edge face of the door.

5. A vehicle door according to claim 1, wherein the frame members are lightweight metal extrusions.

6. A vehicle door, comprising a structural framework having hollow-core-forming frame members of strong and lightweight material provided with anchor holes; inside and outside panels of strong and lightweight material; a strong adhesive material bonding said panels and framework into a structurally integrated, laminated unit having a hollow core interiorly thereof and between said panels, said adhesive penetrating said holes and securely anchoring said panels to said framework; means in said door for receiving a vehicle window and window-operating mechanism, and means including a door handle for opening and closing said door.

7. A vehicle door according to claim 6, wherein the structural framework is made up of aluminum extrusions, the panels are fiberglass impregnated with polyester resin, and the adhesive material is a polyester resin.

8. A vehicle door according to claim 7, wherein the adhesive bonding material comprises fiberglass mats impregnated with polyester resin interposed between the respective panels and the framework.

9. A vehicle door according to claim 6, wherein the frame members are lightweight metal extrusions.

10. A vehicle door, comprising an interior framework of lightweight, hollow-core-forming, frame members and having mutually opposite, broad faces corresponding to the outside and inside faces of the door, respectively; inside and outside fiberglass panels, there being an opening in the inside panel to provide access to the interior of the door; adhesive means bonding said panels to the respectively corresponding faces of said framework; a window opening provided by the framework and by the said inside and outside panels; and a pair of window guide channels removably fastened within said door, said channels being removable through said window opening.

References Cited

UNITED STATES PATENTS

| 2,375,369 | 5/1945 | Knight et al. | |
| 2,845,318 | 7/1958 | Brewster et al. | 52—309 |
| 2,924,861 | 2/1960 | Viets | 20—35 |
| 3,068,043 | 12/1962 | Komenda | 296—31 |
| 3,161,267 | 12/1964 | Keller | 52—615 |

KENNETH DOWNEY, *Primary Examiner.*